United States Patent [19]

Citron

[11] 4,344,306
[45] Aug. 17, 1982

[54] OVERLOAD CLUTCH

[76] Inventor: Manning Citron, 1895 Warwick Rd., San Marino, Calif. 91108

[21] Appl. No.: 164,690

[22] Filed: Jun. 30, 1980

[51] Int. Cl.³ ............................................. F16D 7/02
[52] U.S. Cl. ...................................... 464/34; 464/73; 464/85
[58] Field of Search .................. 64/11 R, 14, 27 NM, 64/28 R, 30 D, 30 E

[56] References Cited

U.S. PATENT DOCUMENTS

| | | | |
|---|---|---|---|
| 2,326,450 | 8/1943 | Fawich | 64/14 |
| 3,620,044 | 11/1971 | Latour | 64/14 |
| 3,621,675 | 11/1971 | Conaghan et al. | 64/27 NM |
| 3,942,338 | 3/1976 | Furlette et al. | 64/30 D |
| 4,056,953 | 11/1977 | Furlette et al. | 64/30 D |
| 4,143,525 | 3/1979 | Major | 64/30 D |

FOREIGN PATENT DOCUMENTS 1008063  5/1957  Fed. Rep. of Germany ... 64/27 NM

*Primary Examiner*—Ira S. Lazarus
*Attorney, Agent, or Firm*—Christie, Parker & Hale

[57] ABSTRACT

An overload clutch is described which includes a drive member and a driven member which are coaxial and have concentric cylindrical surfaces which form an annular chamber. One or more rollers of elastomeric material are positioned in the chamber with the rollers in rolling contact with the concentric cylindrical surfaces. Teeth project into the annular chamber from both surfaces and engage the rollers from diametrically opposite positions to transmit torque from the drive to the driven member. Excessive torque causes the rollers to compress between the two engaging teeth, the roller passing between the teeth and allowing the drive member to rotate relative to the driven member.

5 Claims, 4 Drawing Figures

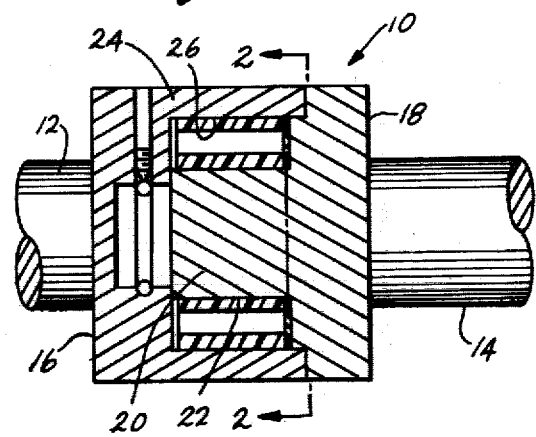
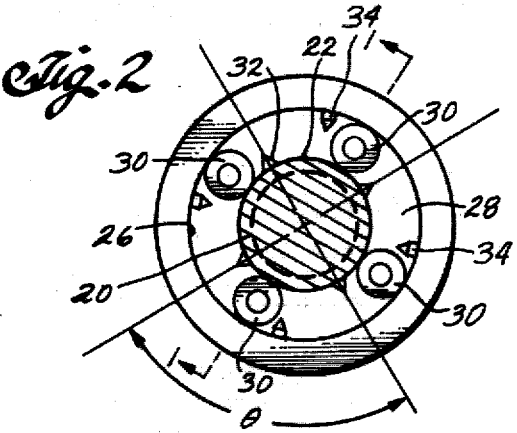
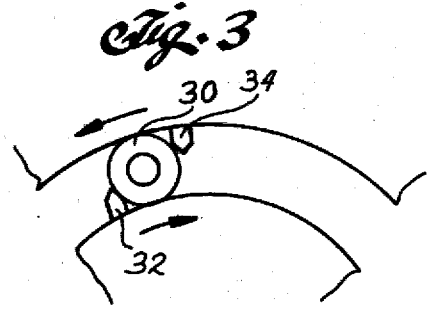
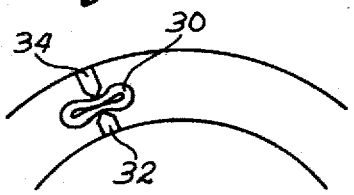

OVERLOAD CLUTCH

FIELD OF THE INVENTION

This invention relates to overload clutches, and more particularly, to a torque limiting shaft coupler.

BACKGROUND OF THE INVENTION

The use of overload clutches to transmit torque from a drive member to a driven member is well known. The function of the overload clutch is to limit the maximum torque that can be transmitted to prevent damage to the drive train in case the driven member becomes overloaded. One type of bi-directional torque limiting coupler, such as described in U.S. Pat. Nos. 3,942,338 and 4,143,525, utilizes an elastomeric roller which rolls between the cylindrical interior surface of a tubular drive member and the irregular outer surface of a coaxial driven member. The irregular surface may be toothed or hexagonal or other shape in which the radial distance of the surface to the axis of rotation varies around the circumference. Torque is transmitted through the elastomeric roller, the roller being squeezed between the interior of the tube and the irregular surface. The maximum torque that can be transmitted is limited by the force required to squeeze the roller through the minimum radial space between the irregular surface and the surrounding cylindrical surface.

SUMMARY OF THE INVENTION

The present invention is directed to an improved overload clutch of the above-described type using elastomeric rollers to transmit torque. The present invention provides an arrangement in which the rollers are trapped between a pair of teeth projecting respectively radially inwardly and radially outwardly on either side of the roller so that under normal load conditions, the torque is transmitted with a very small radial component of force, thus minimizing radial load by-products which could distort the drive or driven members. Furthermore, the trapping action of the roller between the opposing teeth assures positive angular phasing or "timing" of the drive and driven members during transmission of normal torque loads. The trapping action also minimizes the tendency of the rollers to become skewed relative to the axis of rotation of the drive and driven members.

These and other advantages of the overload clutch design of the present invention are achieved by providing coaxial drive and driven members having overlapping or concentric inner and outer cylindrical surfaces forming an annular chamber in which are positioned a plurality of cylindrical rollers of elastomeric material. A plurality of angularly spaced radial teeth project into the annular chamber from both said cylindrical surfaces, the respective teeth projecting distances whose sum is slightly less than the radial distance between the cylindrical surfaces. The elastomeric rollers are trapped between pairs of teeth projecting respectively from the two surfaces. Under overload condition, the rollers are pinched between the ends of the teeth, allowing one tooth to move past the other tooth of a pair, thereby allowing the drive member to rotate relative to the driven member.

BRIEF DESCRIPTION OF THE DRAWINGS

For a more complete understanding of the invention reference should be made to the accompanying drawings, wherein:

FIG. 1 is a sectional view taken substantially on the line 1—1 of FIG. 2;

FIG. 2 is a sectional view taken substantially on the line 2—2 of FIG. 1;

FIG. 3 is a partial detail view showing the coupler in the normal drive position; and FIG. 4 is a partial view showing the coupler in the maximum torque overload condition.

DETAILED DESCRIPTION

Referring to the drawings in detail, the numeral 10 indicates generally a coupler which transmits torque between a pair of aligned shafts 12 and 14 which are journaled for rotation about a common axis of rotation. Since the coupler 10 is bi-directional in its operation, either shaft may be the drive shaft and the other shaft be the driven shaft.

The coupler 10 includes two members 16 and 18, one of which operates as the drive member and the other operates as the driven member. The members 16 and 18 are integral with or otherwise rigidly secured to the shafts 12 and 14. The member 16 has a tubular portion 24 having an inner cylindrical surface 26. The member 18 has a portion 20 having an outer cylindrical surface 22 which projects into the tubular portion 24 of the member 16, thus forming an annular chamber 28 between the two members.

One or more cylindrical rollers 30 are positioned in the annular chamber 28, four such rollers being shown by way of example in FIG. 2. The rollers are made of an elastomeric material such as rubber polyethylene, or the like and may be made tubular to make the rollers even more compressible. The diameter of the rollers is substantially equal to the radial distance between the cylindrical surfaces 22 and 26. The diameter may be slightly smaller to reduce the rolling friction to substantially zero, or the diameter may be larger than the space to increase the rolling friction between the roller and the two surfaces. The cylindrical portion 20 of the member 18 has a plurality of radial projections or teeth 32 extending into the chamber 28. The teeth 32 extend lengthwise in a direction parallel to the axis of rotation of the coupler substantially the full length of the rollers. A second group of teeth 34 project inwardly from the cylindrical surface 26 of the member 16.

As shown in detail in FIG. 3, relative rotation of the members 16 and 18 in the direction of the arrows causes a roller 30 to be trapped between a pair of teeth projecting respectively from the two members, placing the roller in compression. A substantially tangential force is transmitted between the two teeth through the roller. The roller is confined radially between the concentric surfaces of the two members. As the torque load transmitted by the coupler increases, the tangential force exerted on the roller by the teeth increase, causing the roller to be pinched between the ends of the teeth. As the torque load continues to increase, the roller is pinched and compressed to the point that it passes between the ends of the teeth when the teeth are radially aligned, as shown in FIG. 4. It will be seen in FIG. 4 that the radial spacing between opposing teeth is such that the tubular roller is fully collapsed as the opposing teeth move past each other. Thus the tubular shape of the rollers allows a minimum spacing between the opposing teeth (approximately twice the wall thickness of the tubular roller) while still allowing the roller to pass between the teeth. At this point the torque on the drive member drops to substantially zero, allowing the drive member to rotate relative to the driven member until the roller is trapped between another pair of teeth.

It will be seen that the normal load torque that is transmitted and the maximum torque that is transmitted by the coupler is controlled by a number of factors. For example, the greater number of rollers that are trapped between teeth, the greater the torque that can be transmitted for normal load conditions. The torque characteristics can also be controlled by changing the length, wall thickness and/or the elasticity and resilience of the material of the roller. Also the size and shape of the teeth, as well as the angular relationship of the teeth, may be varied so that at, a given angular relationship between the members 16 and 18, the several rollers will be in different states of compression. For example, in the arrangement shown in FIG. 2, it has been found desirable to make the angle $\theta$ between the two sets of diametrically opposed teeth on the inner cylindrical surface 22 to be made slightly less than 90 degrees. By this arrangement, the phase angles between the two members at which adjacent rollers pass between the ends of the teeth are staggered slightly, increasing the "dwell" time of maximum torque.

What is claimed is:

1. An overload clutch or the like, comprising:
 a rotatable drive member, a rotating driven member coaxial with the drive member, said members forming an annular chamber having concentric inner and outer cylindrical surfaces which are rotated respectively by the drive and driven members about their common axis, and a plurality of cylindrical rollers of elastomeric material in said annular chamber between said inner and outer cylindrical surfaces, both members including angularly spaced radial teeth projecting into the annular chamber from said cylindrical surfaces a distance less than half the radial distance between said surfaces, each of the rollers being positioned between a pair of teeth projecting into the annular chamber respectively from the two members, the arcuate spacing between adjacent teeth projecting from one of said members being slightly different from the arcuate spacing of the opposing teeth projecting from the other member, whereby the rollers positioned between adjacent pairs of teeth are in a different state of compression when transmitting torque.

2. Apparatus of claim 1 wherein the rollers have a diameter substantially equal to the radial dimension of the annular chamber.

3. Apparatus of claim 2 wherein the rollers are tubular.

4. A coupling device comprising:
 a first member journaled for rotation about an axis, the first member having a bore open at one end forming a cylindrical wall concentric with said axis, a second member journaled for rotation about said axis, the second member having a cylindrical end portion of smaller diameter than said cylindrical wall and extending into the open end of the first member, a plurality of tubular rollers positioned in the annular space between the cylindrical wall and the cylindrical end portion, a plurality of teeth projecting into the annular space from the first member on one side of each roller and from the second member on the other side of each roller, the projecting teeth having radial clearance therebetween permitting rotation of one member relative to the other, the projecting teeth engaging and squeezing the tubular rollers therebetween when the one member is rotated relative to the other member, the rollers being made of material sufficiently compressible and resilient that the walls of the tubular rollers can be collapsed shut and squeezed between the projecting teeth as the two members rotate relative to each other and still return to their original shape after passing between the teeth.

5. The device of claim 4 wherein the spacing between adjacent teeth projecting from the first member is different from the spacing between adjacent teeth projecting from the second member, whereby rollers engaging different teeth are in a different state of compression.

* * * * *